(12) United States Patent
Bae et al.

(10) Patent No.: US 11,101,747 B2
(45) Date of Patent: Aug. 24, 2021

(54) TEXTILE-BASED ENERGY GENERATOR

(71) Applicant: Samsung Electronics Co., Ltd., Suwon-si (KR)

(72) Inventors: Jihyun Bae, Seoul (KR); Jongjin Park, Hwaseong-si (KR); Seongmin Kim, Suwon-si (KR); Byoungsun Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 222 days.

(21) Appl. No.: 15/825,592

(22) Filed: Nov. 29, 2017

(65) Prior Publication Data

US 2018/0091065 A1 Mar. 29, 2018

Related U.S. Application Data

(62) Division of application No. 14/474,425, filed on Sep. 2, 2014, now Pat. No. 9,876,443.

(30) Foreign Application Priority Data

Sep. 2, 2013 (KR) ........................ 10-2013-0105096

(51) Int. Cl.
*H02N 1/04* (2006.01)
*B82Y 99/00* (2011.01)

(52) U.S. Cl.
CPC ............... *H02N 1/04* (2013.01); *B82Y 99/00* (2013.01); *Y10S 977/948* (2013.01)

(58) Field of Classification Search
CPC .. H02N 1/04; H02N 2/18; H02N 2/00; H02N 11/00; H01L 41/047; H01L 41/0477;
(Continued)

(56) References Cited

U.S. PATENT DOCUMENTS 5,842,087 A 11/1998 Matsushita et al.
8,716,920 B2 5/2014 Kim et al.
(Continued)

FOREIGN PATENT DOCUMENTS

JP 11283731 * 10/1999
JP 2008148452 * 6/2008 ............. H02N 11/00
(Continued)

OTHER PUBLICATIONS

G. Zhu, "Toward Large-Scale Energy Harvesting by a Nanopartide-Enhanced Triboelectric Nanogenerator", Jan. 23, 2013, 9pgs., pubs. acs.org/Nanolett.
(Continued)

*Primary Examiner* — Tran N Nguyen
(74) *Attorney, Agent, or Firm* — Harness, Dickey & Pierce, P.L.C.

(57) ABSTRACT

In an example embodiment, a textile-based energy generator includes first and second electrode substrates, each of the first and second electrode substrates including a textile structure and an energy generation layer between the first and second electrode substrates, the energy generation layer on at least one of the first and second electrode substrates, the energy generation layer configured to generate electrical energy by at least one of generating friction between different materials and contacting and separating the different materials.

3 Claims, 4 Drawing Sheets

(58) Field of Classification Search
CPC ........ H01L 41/11; H01L 41/113; H01L 41/02; B06B 1/06; B82B 1/00
See application file for complete search history.

(56) References Cited

U.S. PATENT DOCUMENTS

| | | | |
|---|---|---|---|
| 2007/0148399 A1* | 6/2007 | Chen | C23C 14/205 |
| | | | 428/96 |
| 2011/0050181 A1* | 3/2011 | Post | H02N 1/04 |
| | | | 320/166 |
| 2011/0148248 A1 | 6/2011 | Landa | |
| 2011/0204317 A1 | 8/2011 | Park et al. | |
| 2012/0013223 A1* | 1/2012 | Hsu | H01L 41/1134 |
| | | | 310/339 |
| 2012/0172940 A1* | 7/2012 | Wahls | A61N 1/0456 |
| | | | 607/3 |
| 2013/0020909 A1 | 1/2013 | Kim et al. | |
| 2013/0049531 A1* | 2/2013 | Wang | H02N 1/04 |
| | | | 310/309 |
| 2013/0224551 A1* | 8/2013 | Hiralal | H01M 2/1626 |
| | | | 429/127 |

FOREIGN PATENT DOCUMENTS

| | | |
|---|---|---|
| JP | 2010-263750 A | 11/2010 |
| KR | 1020120122402 A | 11/2012 |
| KR | 1020130011137 A | 1/2013 |
| KR | 1020130024224 A | 3/2013 |

OTHER PUBLICATIONS

Zhang, X. et al., "Frequency-Multiplication High-Output Triboelectric Nanogenerator for Sustainably Powering Biomedical Microsystems," Nano Letters, pp. 1168-1172. 2013.

Feng-RuFan, "Flexible triboelectric generator," Nano Energy, Jan. 20, 2012.

Tang, W., "Investigation of power generation based on stacked triboelectric nanogenerator," Energy, May 7, 2013.

Korean Office Action and English translation thereof dated Sep. 23, 2019.

* cited by examiner

TEXTILE-BASED ENERGY GENERATOR

CROSS-REFERENCE TO RELATED APPLICATIONS

This application is a divisional application of and claims priority under 35 U.S.C. §§ 120,121 to U.S. application Ser. No. 14/474,425 filed Sep. 2, 2014, which claims priority under 35 U.S.C. § 119 to Korean Patent Application No. 10-2013-0105096, filed on Sep. 2, 2013, in the Korean Intellectual Property Office, the entire contents of each of these applications are incorporated herein by reference.

BACKGROUND

1. Field

The present disclosure relates to energy generators, and more particularly, to textile-based energy generators.

2. Description of the Related Art

Recently, flexible and stretchable devices such as wearable computers have been actively developed. In order to realize a flexible and stretchable electronic device, an energy generator for supplying an appropriate amount of electrical energy is demanded. In addition, recently, an energy harvesting technique has been highlighted. Devices for harvesting energy may be referred to as new environment-friendly energy generation devices for converting ambient wind or vibrations or mechanical energy generated from human motion into electrical energy and extracting the converted electrical energy.

SUMMARY

Provided are textile-based energy generators.

Additional aspects will be set forth in part in the description which follows and, in part, will be apparent from the description, or may be learned by practice of example embodiments.

According to at least one example embodiment, a textile-based energy generator includes first and second electrode substrates, each of the first and second electrode substrates including a textile structure, and an energy generation layer between the first and second electrode substrates, the energy generation layer on at least one of the first and second electrode substrates, and the energy generating layer configured to generate electrical energy by at least one of generating friction between different materials and contacting and separating the different materials.

Each of the first and second electrode substrates may have an elongation percentage ranging from about 10% to about 100%. Each of the first and second electrode substrates may include a material capable of inducing periodic vibrations in the flow of fluid.

The first electrode substrate including a first textile substrate and a first electrode coated on the first textile substrate, and the second electrode substrate includes a second textile substrate and a second electrode coated on the second textile substrate. Each of the first and second textile substrates includes weaving fibers. Each of the first and second electrodes may include graphene, carbon nanotubes (CNTs), indium tin oxide (ITO), a metal, or a conductive polymer. The metal may include at least one selected from the group consisting of gold (Au), silver (Ag), copper (Cu), nickel (Ni), and aluminum (Al).

The energy generation layer may include a first triboelectric layer on one of the first and second electrodes, and includes a first dielectric substance or a metal, and a second triboelectric layer on the remaining one of the first and second electrodes, and the second triboelectric layer includes a second dielectric substance that is different from the first dielectric substance. The first dielectric substance may include polyformaldehyde, etylcellulose, polyamide, wool, silk, paper, cotton, wood, or polyvinyl acetate (PVA), and the second dielectric substance includes fluoropolymer, silicon rubber, teflon, kapton, polypropylene, polyethylene, polyethylene terephalate, polyimide, polyvinylidendefluoride (PVDF), polydimethylsiloxane (PDMS), polymethylmethacrylate (PMMA), or polyvinyl chloride (PVC). A plurality of first protrusions may be on a surface of the first triboelectric layer, and a plurality of second protrusions may be on a surface of the second triboelectric layer.

The energy generation layer may include a triboelectric layer that is disposed on one of the first and second electrodes, the energy triboelectric layer includes a dielectric substance. The remaining one of the first and second electrodes may include a metal.

The first electrode substrate may include a first textile electrode, and the second electrode substrate includes a second textile electrode. Each of the first and second textile electrodes includes weaved fibers. Each of the first and second textile electrodes may include graphene, CNTs, a metal, or a conductive polymer.

The energy generation layer may include a first triboelectric layer on one of the first and second textile electrodes, and the first triboelectric layer includes a first dielectric substance or a metal, and a second triboelectric layer that is on the remaining one of the first and second textile electrodes, and the second triboelectric layer includes a second dielectric substance that is different from the first dielectric substance. A plurality of first protrusions may be on a surface of the first triboelectric layer, and a plurality of second protrusions may be on a surface of the second triboelectric layer.

The energy generation layer may include a triboelectric layer on one of the first and second textile electrodes, and the triboelectric layer includes a dielectric substance. The remaining one of the first and second textile electrodes may include a metal.

According to at least another example embodiment, a textile-based energy generator includes at least three electrode substrates, each of the three electrode substrates including a textile structure; and a plurality of energy generation layers between the at least three electrode substrates, respectively, wherein each of the plurality of energy generation layers is on at least one of the electrode substrates, and each of the plurality of energy generation layers is configured to generate electrical energy by generating friction or periodically generating contact and separation between different materials.

The at least three electrode substrates may be connected in series or parallel.

At least one example embodiment discloses an energy generator including first electrode substrate including a first textile material, a second electrode substrate including a second textile material and an energy generation layer between the first and second electrode substrate, the energy generation layer configured to generate energy based on a movement between different materials between the first electrode substrate and the second electrode substrate.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of this disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Figure 1:
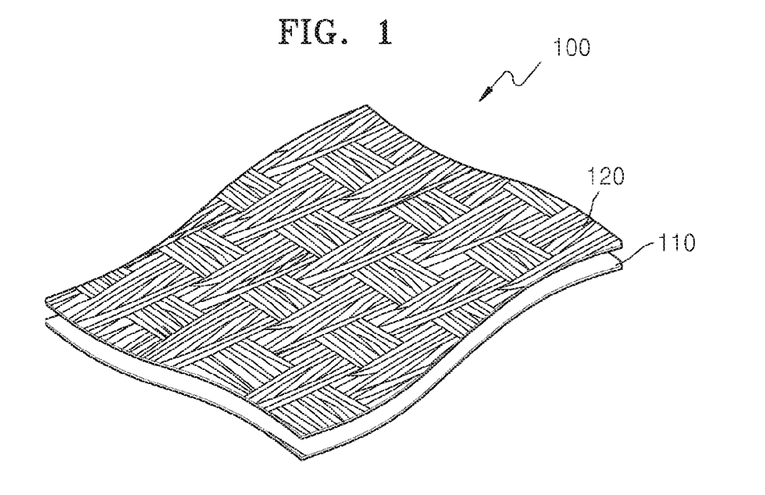
FIG. 1 is a perspective view illustrating a textile-based energy generator according to an example embodiment.
Figure 2:
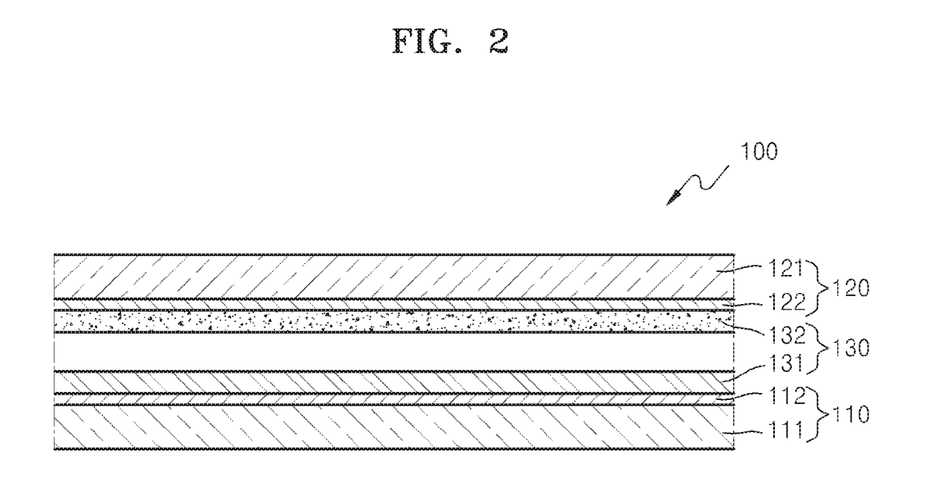
FIG. 2 is a cross-sectional view illustrating a part of the textile-based energy generator of FIG. 1.

FIG. 1 is a perspective view illustrating a textile-based energy generator 100 according to an example embodiment. FIG. 2 is a cross-sectional view illustrating a part of the textile-based energy generator 100 of FIG. 1.

Referring to FIGS. 1 and 2, the textile-based energy generator 100 includes first and second electrode substrates 110 and 120 that are spaced apart from each other to face each other, and an energy generation layer 130 that is disposed between the first and second electrode substrates 110 and 120. Each of the first and second electrode substrates 110 and 120 has a flexible and stretchable textile structure. Each of the first and second electrode substrates 110 and 120 may have, but is not limited to, an elongation percentage ranging from about 10% to about 100%.

The first electrode substrate 110 may include a first textile substrate 111 that has a flexible and stretchable two-dimensional (2D) shape, and a first electrode 112 that is coated on the first textile substrate 111. The second electrode substrate 120 may include a second textile substrate 121 that has a flexible and stretchable 2D shape, and a second electrode 122 that is coated on the second textile substrate 121. Each of the first and second textile substrates 111 and 121 may be formed by weaving fibers having one-dimensional (1D) shapes. Although the fibers may include an insulating material, example embodiments are not limited thereto and the fibers may include a conductive material. The first electrode 112 is coated on a top surface of the first textile substrate 111, and the second electrode 122 is coated on a bottom surface of the second textile substrate 121. Each of the first and second electrodes 112 and 122 may include, for example, graphene, carbon nanotubes (CNTs), indium tin oxide (ITO), a metal, or a conductive polymer. The metal may include, but is not limited to, at least one selected from the group consisting of gold (Au), silver (Ag), copper (Cu), nickel (Ni), and aluminum (Al). The first and second electrodes 112 and 122 may be respectively coated on the first and second textile substrates 111 and 121 by using, for example, electroless plating or deposition. For example, when the first and second electrodes 112 and 122 are coated by using electroless plating, since the fibers having the 1D shapes independently bend in the flow of fluid, mechanical stability may be ensured.

As such, since the first and second electrode substrates 110 and 120 are textile-based flexible substrates, periodic vibrations may be induced in the flow of fluid and thus electrical energy may be more efficiently generated. Also, since an amplitude of flutter that occurs at the same fluid velocity is higher in a textile-based substrate than in a film-based substrate, when the first and second electrode substrates 110 and 120 are textile-based flexible substrates, electrical energy may be more efficiently generated than when they are film-based substrates.

The energy generation layer 130 is disposed between the first electrode substrate 110 and the second electrode substrate 120. In one embodiment, the energy generation layer 130 generates electrical energy due to triboelectricity. That is, the energy generation layer 130 generates electrical energy by generating friction or by periodically contacting and separating different materials. The energy generation layer 130 may include a first triboelectric layer 131 that is disposed on a top surface of the first electrode 112, and a second triboelectric layer 132 that is disposed on a bottom surface of the second electrode 122. The first triboelectric layer 131 may include a first dielectric substance or a metal, and the second triboelectric layer 132 may include a second dielectric substance that is different from the first dielectric substance. When friction is generated or contact and separation occur between the first and second triboelectric layers 131 and 132, electrical energy may be generated.

The first triboelectric layer 131 may include, for example, a first dielectric substance or a metal which is easily positively charged. The first dielectric substance may include a natural fiber material or a synthetic fiber material. In detail, the first dielectric substance may include, but is not limited to, polyformaldehyde, etylcellulose, polyamide, wool, silk, paper, cotton, wood, or polyvinyl acetate (PVA). The metal may include, but is not limited to, aluminum (Al), nickel (Ni), copper (Cu), or silver (Ag). The second triboelectric layer 132 may include, for example, a second dielectric substance that is easily negatively charged. The second dielectric substance may include a dielectric material having an electric charge or dipole polarization. In detail, the second dielectric substance may include, but is not limited to, fluoropolymer, silicon rubber, teflon, kapton, polypropylene, polyethylene, polyethylene terephalate, polyimide, polyvinylidendefluoride (PVDF), polydimethylsiloxane (PDMS), polymethylmethacrylate (PMMA), or polyvinyl chloride (PVC). Alternatively, the first triboelectric layer 131 may include a material that is easily negatively charged, and the second triboelectric layer 132 may include a material that is easily positively charged.

The first and second triboelectric layers 131 and 132 may be charged by being forced to directly contact each other, and then may be spaced apart from each other by a desired or predetermined interval. As such, when friction is generated or contact and separation occur between the first and second triboelectric layers 131 and 132 due to an external force in a state where the first and second triboelectric layers 131 and 132 are spaced apart from each other, there is a charge density difference between the first and second triboelectric layers 131 and 132, thereby generating electrical energy. Although the first triboelectric layer 131 including a first dielectric substance or a metal is disposed on the first electrode 112 and the second triboelectric layer 132 including a second dielectric substance is disposed on the second electrode 122 in FIGS. 1 and 2, example embodiments are not limited thereto, and the first triboelectric layer 131 may be disposed on the second electrode 122 and the second triboelectric layer 132 may be disposed on the first electrode 112.

As described above, the textile-based energy generator 100 has a flexible and stretchable textile structure. When a mechanical force is applied due to wind, vibration, sound, or human motion to the textile-based energy generator 100, friction may be generated or contact and separation occur between the first and second triboelectric layers 131 and 132, thereby generating electrical energy. The textile-based energy generator 100 may more efficiently generate electrical energy by inducing periodic vibrations in the flow of fluid. Also, since an amplitude of flutter that occurs at the same fluid velocity is higher in a textile-based substrate than in a film-based substrate, the textile-based energy generator 100 may more efficiently generate electrical energy than a film-based energy generator. Since the textile-based energy generator 100 may have conformity to an external environment such as wind, sound or human motion, the textile-based energy generator 100 may more efficiently generate electrical energy in response to the external environment. The textile-based energy generator 100 may be applied to a portable electronic device, a garment, a bag, a hat, gloves, or a flag, or may be attached to a body part, to generate electrical energy. Also, the textile-based energy generator 100 may be attached to a transport such as an automobile, a bicycle, or a train, or may be used as a textile construction material, to generate electrical energy.

Figure 3:
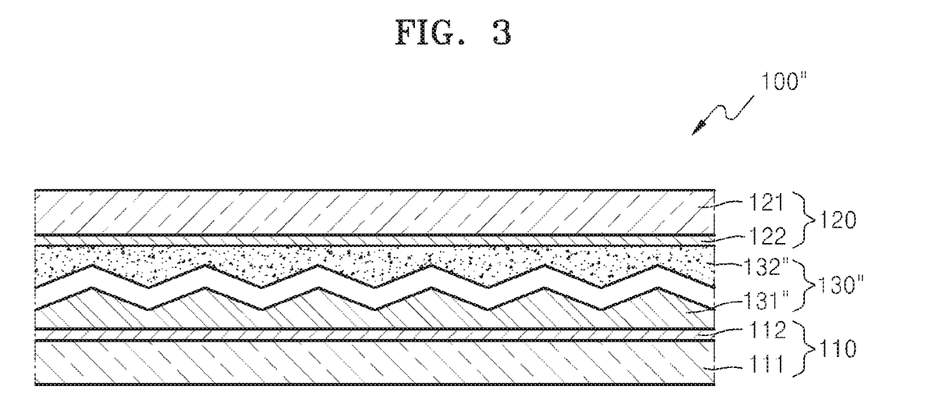
FIG. 3 is a cross-sectional view illustrating a textile-based energy generator according to another example embodiment.

FIG. 3 is a cross-sectional view illustrating a textile-based energy generator 100" according to another example embodiment.

Referring to FIG. 3, the textile-based energy generator 100" includes the first and second electrode substrates 110 and 120 that are spaced apart from each other to face each other, and an energy generation layer 130" that is disposed between the first and second electrode substrates 110 and 120. Each of the first and second electrode substrates 110 and 120 has a flexible and stretchable textile structure. Each of the first and second electrode substrates 110 and 120 may have, but is not limited to, an elongation percentage ranging from about 10% to about 100%. Each of the first and second electrode substrates 110 and 120 may include a material capable of inducing periodic vibrations in the flow of fluid.

In detail, the first electrode substrate 110 includes the first textile substrate 111 that has a flexible and stretchable 2D shape and the first electrode 112 that is coated on the first textile substrate 111, and the second electrode substrate 120 includes the second textile substrate 121 that has a flexible and stretchable 2D shape and the second electrode 122 that is coated on the second textile substrate 121. As described above, since the first and second electrode substrates 110 and 120 are textile-based flexible substrates, periodic vibrations may be induced in the flow of fluid, and electrical energy may be more efficiently generated than when they are film-based substrates.

The energy generation layer 130" is disposed between the first and second electrodes 112 and 122. The energy generation layer 130" may include a first triboelectric layer 131" that is disposed on a top surface of the first electrode 112 and a second triboelectric layer 132" that is disposed on a bottom surface of the second electrode 122. The energy generation layer 130" may generate electrical energy by generating friction or be periodically contacting and separating the first triboelectric layer 131" and the second triboelectric layer 132". The first triboelectric layer 131" may include a first dielectric substance or a metal, and the second triboelectric layer 132" may include a second dielectric substance that is different from the first dielectric substance. The first triboelectric layer 131" may include a material that is easily positively charged, and the second triboelectric layer 132" may include a material that is easily negatively charged. Alternatively, the first triboelectric layer 131" may include a material that is easily negatively charged, and the second triboelectric layer 132" may include a material that is easily positively charged.

Surfaces of the first and second triboelectric layers 131" and 132" may be processed to be rough. In detail, first protrusions may be formed on a surface of the first triboelectric layer 131", and second protrusions may be formed on a surface of the second triboelectric layer 132". The first and second protrusions may be spaced apart from each other to be alternately arranged. The first and second protrusions may have, but are not limited to, for example, nanopyramid shapes.

The first and second triboelectric layers 131" and 132" may be charged by being forced to directly contact each other, and then may be spaced apart from each other by a desired or predetermined interval. As such, when friction is generated or contact and separation occur between the first triboelectric layer 131" and the second triboelectric layer 132" due to an external force in a state where the first and second triboelectric layers 131" and 132" are spaced apart from each other, there is a charge density difference between the first and second triboelectric layers 131" and 132", thereby generating electrical energy. Also, since the first and second protrusions that are alternately arranged are formed on the surfaces of the first and second triboelectric layers 131" and 132", and thus the textile-based energy generator 100' may react to even a small external force and a dielectric interfacial area in which friction is generated may be increased, electrical energy may be more efficiently generated. Although the first triboelectric layer 131" including a first dielectric substance or a metal is disposed on the first electrode 112 and the second triboelectric layer 132" including a second dielectric substance is disposed on the second electrode 122 in FIG. 3, example embodiments are not limited thereto, and the first triboelectric layer 131" may be disposed on the second electrode 122 and the second triboelectric layer 132" may be disposed on the first electrode 112.

Figure 4:
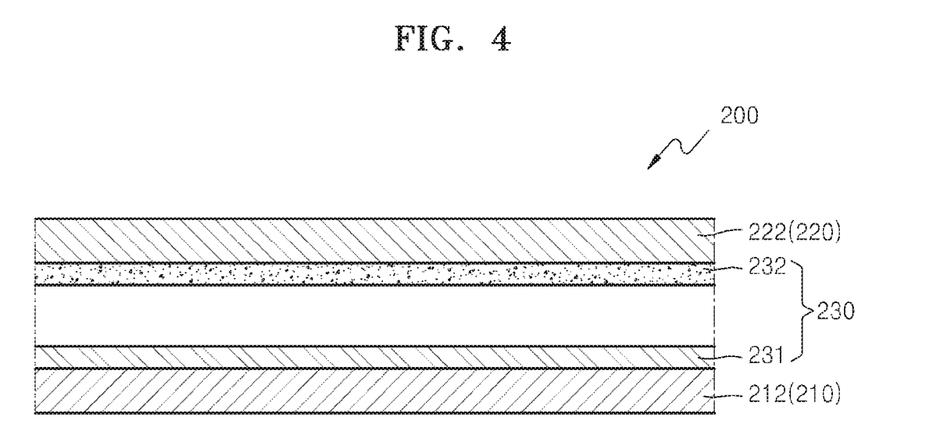
FIG. 4 is a cross-sectional view illustrating a textile-based energy generator according to another example embodiment.

FIG. 4 is a cross-sectional view illustrating a textile-based energy generator 200 according to another example embodiment.

Referring to FIG. 4, the textile-based energy generator 200 includes first and second electrode substrates 210 and 220 that are spaced apart from each other to face each other, and an energy generation layer 230 that is disposed between the first and second electrode substrates 210 and 220. Each of the first and second electrode substrates 210 and 220 has a flexible and stretchable textile structure. Each of the first and second electrode substrates 210 and 220 may have, but is not limited to, an elongation percentage ranging from about 10% to about 100%. Each of the first and second electrode substrates 210 and 220 may include a material capable of inducing periodic vibrations in the flow of fluid.

In detail, the first electrode substrate 210 may include a first textile electrode 212 that has a flexible and stretchable 2D shape, and the second electrode substrate 220 may include a second textile electrode 222 that has a flexible and stretchable 2D shape. Each of the first and second textile electrodes 212 and 222 may be formed by, for example, weaving conductive fibers having 1D shapes. Each of the first and second textile electrodes 212 and 222 may include, but is not limited to, for example, graphene, CNTs, ITO, a metal, or a conductive polymer. The metal may include, but is not limited to, at least one selected from the group consisting of, for example, Au, Ag, Cu, Ni, and Al.

The energy generation layer 230 may be disposed between the first electrode substrate 210 and the second electrode substrate 220. The energy generation layer 230 may include a first triboelectric layer 231 that is disposed on a top surface of the first textile electrode 212, and a second triboelectric layer 232 that is disposed on a bottom surface of the second textile electrode 222. The energy generation layer 230 generates electrical energy by generating friction or by periodically contacting and separating the first triboelectric layer 231 and the second triboelectric layer 232. The first triboelectric layer 231 may include a first dielectric substance or a metal, and the second triboelectric layer 232 may include a second dielectric substance that is different from the first dielectric substance.

The first triboelectric layer 231 may include, for example, a first dielectric substance or a metal which is easily positively charged. The first dielectric substance may include a natural fiber material or a synthetic fiber material. In detail, the first dielectric substance may include, but is not limited to, polyformaldehyde, etylcellulose, polyamide, wool, silk, paper, cotton, wood, or PVA. The metal may include, but is not limited to, Al, Ni, Cu, or Ag. The second triboelectric layer 232 may include, for example, a second dielectric substance that is easily negatively charged. The second dielectric substance may include a dielectric material having an electric charge or dipole polarization. In detail, the second dielectric substance may include, but is not limited to, fluoropolymer, silicon rubber, teflon, kapton, polypropylene, polyethylene, polyethylene terephalate, polyimide, PVDF, PDMS, PMMA, or PVC. However, example embodiments are not limited thereto, and the first triboelectric layer 231 may include a material that is easily negatively charged, and the second triboelectric layer 232 may include a material that is easily positively charged.

The first and second triboelectric layers 231 and 232 may be charged by being forced to directly contact each other, and then may be spaced apart from each other by a desired or predetermined interval. As such, when friction is generated or contact and separation occur between the first triboelectric layer 231 and the second triboelectric layer 232 due to an external force in a state where the first and second triboelectric layers 231 and 232 are spaced apart from each other, there is a charge density difference between the first and second triboelectric layers 231 and 232, thereby generating electrical energy. In order to more efficiently generate electrical energy, a plurality of first protrusions and a plurality of second protrusions that are alternately arranged may be formed on surfaces of the first and second triboelectric layers 231 and 232.

Since the textile-based energy generator 200 may have conformity to an external environment such as wind, sound, or human motion, the textile-based energy generator 200 may more efficiently generate electrical energy in response to the external environment. Although the first triboelectric layer 231 including a first dielectric substance or a metal is disposed on the first textile electrode 212 and the second triboelectric layer 232 including a second dielectric substance is disposed on the second textile electrode 222 in FIG. 4, example embodiments are not limited thereto, and the first triboelectric layer 231 may be disposed on the second textile electrode 222 and the second triboelectric layer 232 may be disposed on the first electrode 212.

Figure 5:
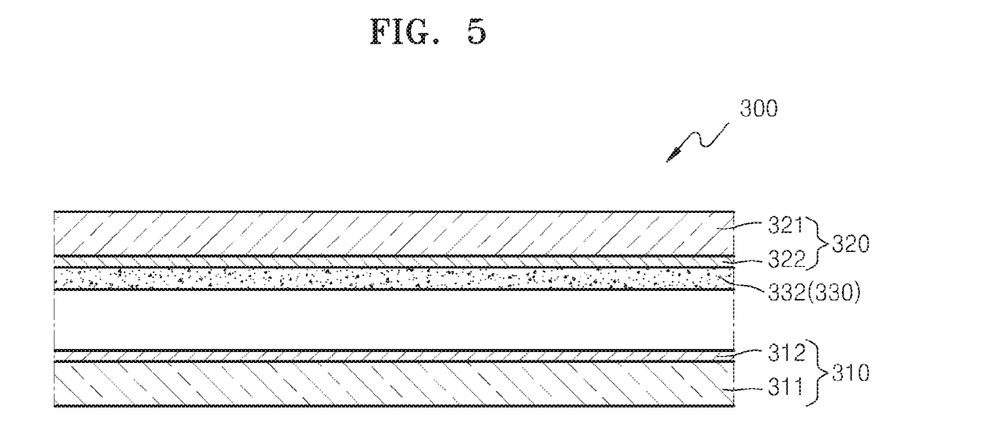
FIG. 5 is a cross-sectional view illustrating a textile-based energy generator according to another example embodiment.

FIG. 5 is a cross-sectional view illustrating a textile-based energy generator 300 according to another example embodiment.

Referring to FIG. 5, the textile-based energy generator 300 includes first and second electrode substrates 310 and 320 that are spaced apart from each other to face each other, and an energy generation layer that is disposed between the first and second electrode substrates 310 and 320. Each of the first and second electrode substrates 310 and 320 has a flexible and stretchable textile structure. Each of the first and second electrode substrates 310 and 320 may have, but is not limited to, an elongation percentage ranging from about 10% to about 100%. Each of the first and second electrode substrates 310 and 320 may include a material capable of inducing periodic vibrations in the flow of fluid.

The first electrode substrate 310 includes a first textile substrate 311 that has a flexible and stretchable 2D shape and a first electrode 312 that is coated on the first textile substrate 311, and the second electrode substrate 320 includes a second textile substrate 321 that has a flexible and stretchable 2D shape and a second electrode 322 that is coated on the second textile substrate 321. Each of the first and second textile substrates 311 and 321 may be formed by, for example, weaving fibers having 1D shapes. Although the fibers may generally include an insulating material, example embodiments are not limited thereto and the fibers may include a conductive material. The first electrode 312 is coated on a top surface of the first textile substrate 311. The first electrode 312 may include a metal. In detail, the first electrode 312 may include, but is not limited to, at least one selected from the group consisting of, for example, Au, Ag, Cu, Ni, and Al. The second electrode 322 is coated on a bottom surface of the second textile substrate 321. The second electrode 322 may include, for example, graphene, CNTs, ITO, a metal, or a conductive polymer. The first and second electrodes 312 and 322 may be respectively coated on the first and second textile substrates 311 and 321 by using, for example, electroless plating or deposition, but example embodiments are not limited thereto.

Since the first and second electrode substrates 310 and 320 are textile-based flexible substrates, periodic vibrations may be induced in the flow of fluid, and thus electrical energy may be more efficiently generated. Also, since an amplitude of flutter that occurs at the same fluid velocity is higher in a textile-based substrate than in a film-based substrate, when the first and second electrode substrates 310 and 320 are textile-based flexible substrates, electrical energy may be more efficiently generated than when they are film-based substrates.

An energy generation layer 330 is disposed between the first electrode substrate 310 and the second electrode substrate 320. The energy generation layer 330 includes a triboelectric layer 332 that is disposed on a bottom surface of the second electrode 322. The energy generation layer 330 may generate electrical energy by generating friction or by periodically contacting and separating the triboelectric layer 332 that is formed of a dielectric substance and the first electrode 312 that is formed of a metal. The triboelectric layer 332 may include a dielectric material having an electric charge or dipole polarization. In detail, the triboelectric layer 332 may include, but is not limited to, fluoropolymer, silicon rubber, teflon, kapton, polypropylene, polyethylene, polyethylene terephalate, polyimide, PVDF, PDMS, PMMA, or PVC.

The first electrode 312 and the triboelectric layer 332 may be charged by being forced to directly contact each other, and then may be spaced apart from each other by a desired or predetermined interval. As such, when friction is generated or contact and separation occur between the first electrode 312 and the triboelectric layer 332 due to an external force in a state where the first electrode 312 and the triboelectric layer 332 are spaced apart from each other, there is a charge density difference between the first electrode 312 and the triboelectric layer 332, thereby generating electrical energy. In order to more efficiently generate electrical energy, a surface of the triboelectric layer 332 may be processed to be rough. Although the triboelectric layer 332 of the energy generation layer 330 is disposed on the second electrode 322 in FIG. 5, example embodiments are not limited thereto and the triboelectric layer 332 may be disposed on the first electrode 312. In this case, electrical energy may be generated when friction is generated or contact and separation occur between the triboelectric layer 332 and the second electrode 322. The second electrode 322 may include a metal.

Figure 6:
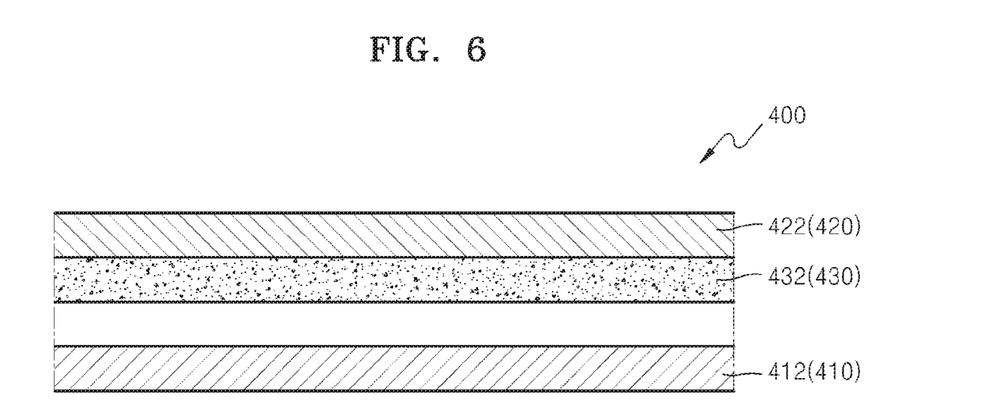
FIG. 6 is a cross-sectional view illustrating a textile-based energy generator according to another example embodiment.

FIG. 6 is a cross-sectional view illustrating a textile-based energy generator 400 according to another example embodiment.

Referring to FIG. 6, the textile-based energy generator 400 includes first and second electrode substrates 410 and 420 that are spaced apart from each other to face each other, and an energy generation layer 430 that is disposed between the first and second electrode substrates 410 and 420. Each of the first and second electrode substrates 410 and 420 has a flexible and stretchable textile structure. Each of the first and second electrode substrates 410 and 420 may have, but is not limited to, an elongation percentage ranging from about 10% to about 100%. Each of the first and second electrode substrates 410 and 420 may include a material capable of inducing periodic vibrations in the flow of fluid.

In detail, the first electrode substrate 410 may include a first textile electrode 412 that has a flexible and stretchable 2D shape, and the second electrode substrate 420 may include a second textile electrode 422 that has a flexible and stretchable 2D shape. Each of the first and second textile electrodes 412 and 422 may be formed by, for example, weaving conductive fibers having 1D shapes. The first textile electrode 412 may include a metal. For example, the first textile electrode 412 may include, but is not limited to, at least one selected from the group consisting of Au, Ag, Cu, Ni, and Al. The second textile electrode 422 may include, but is not limited to, for example, graphene, CNTs, ITO, a metal, or a conductive polymer.

The energy generation layer 430 is disposed between the first electrode substrate 410 and the second electrode substrate 420. The energy generation layer 430 includes a triboelectric layer 432 that is disposed on a bottom surface of the second textile electrode 422. The energy generation layer 430 may generate electrical energy by generating friction or by periodically contacting and separating the triboelectric layer 432 that is formed of a dielectric substance and the first textile electrode 412 that is formed of a metal. The triboelectric layer 432 may include a dielectric material having an electric charge or dipole polarization. In detail, the triboelectric layer 432 may include, but is not limited to, fluoropolymer, silicon rubber, teflon, kapton, polypropylene, polyethylene, polyethylene terephalate, polyimide, PVDF, PDMS, PMMA, or PVC.

The first textile electrode 412 and the triboelectric layer 432 may be charged by being forced to directly contact each other, and then may be spaced apart from each other by a desired or predetermined interval. As such, when friction is generated or contact and separation occur between the triboelectric layer 432 and the first textile electrode 412 due to an external force in a state where the first textile electrode 412 and the triboelectric layer 432 are spaced apart from each other, there is a charge density difference between the first textile electrode 412 and the triboelectric layer 432, thereby generating electrical energy. In order to more efficiently generate electrical energy, a surface of the triboelectric layer 432 may be processed to be rough. Although the triboelectric layer 432 of the energy generation layer 430 is disposed on the second textile electrode 422 in FIG. 6, example embodiments are not limited thereto and the triboelectric layer 432 may be disposed on the first electrode 412. In this case, electrical energy may be generated when friction is generated or contact and separation occur between the triboelectric layer 432 and the second electrode 422. The second electrode 422 may include a metal.

Figure 7:
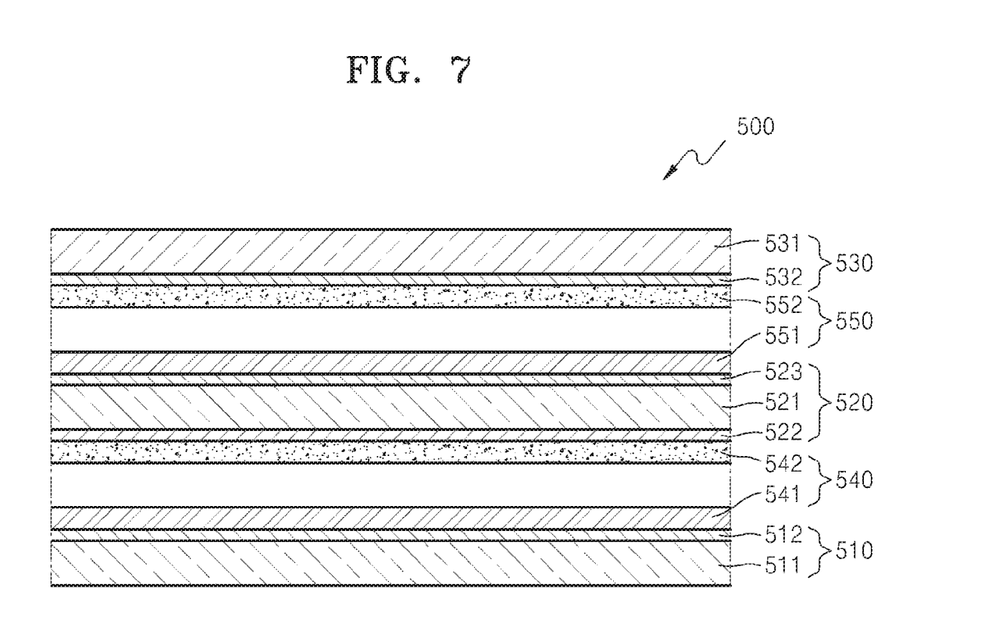
FIG. 7 is a cross-sectional view illustrating a textile-based energy generator according to another example embodiment.

FIG. 7 is a cross-sectional view illustrating a textile-based energy generator 500 according to another example embodiment. FIG. 7 illustrates the textile-based energy generator 500 having a tandem structure in which two energy generation layers are stacked.

Referring to FIG. 7, the textile-based energy generator 500 includes first, second, and third electrode substrates 510, 520, and 530 that are spaced apart from each other to face each other, a first energy generation layer 540 that is disposed between the first and second electrode substrates 510 and 520, and a second energy generation layer 550 that is disposed between the second and third electrode substrates 520 and 530. Each of the first, second, and third electrode substrates 510, 520, and 530 may have a flexible and stretchable textile structure. Each of the first, second, and third electrode substrates 510, 520, and 530 may have, but is not limited to, an elongation percentage ranging from about 10% to about 100%. Each of the first, second, and third electrode substrates 510 through 530 may include a material capable of inducing periodic vibrations in the flow of fluid.

In detail, the first electrode substrate 510 may include a first textile substrate 511 that has a flexible and stretchable 2D shape, and a first electrode 512 that is coated on a top surface of the first textile substrate 511. The second electrode substrate 520 may include a second textile substrate 521 that has a flexible and stretchable 2D shape, a second electrode 522 that is coated on a bottom surface of the second textile substrate 521, and a third electrode 523 that is coated on a top surface of the second textile substrate 521. The third electrode substrate 530 may include a third textile substrate 531 that has a flexible and stretchable 2D shape, and a fourth electrode 532 that is coated on a bottom surface of the third textile substrate 531.

Each of the first, second, and third textile substrates 511, 521, and 531 may be formed by, for example, weaving fibers having 1D shapes. Although the fibers may generally include an insulating material, example embodiments are not limited thereto and the fibers may include a conductive material. Each of the first, second, third, and fourth electrodes 512, 522, 523, and 532 may include, for example, graphene, CNTs, ITO, a metal, or a conductive polymer. That metal may include, but is not limited to, at least one selected from the group consisting of, for example, Au, Ag, Cu, Ni, and Al.

The first energy generation layer 540 is disposed between the first and second electrode substrates 510 and 520, and the second energy generation layer 550 is disposed between the second and third electrode substrates 520 and 530. The first energy generation layer 540 includes a first triboelectric layer 541 that is disposed on a top surface of the first electrode 512, and a second triboelectric layer 542 that is disposed on a bottom surface of the second electrode 522. The first energy generation layer 540 may generate electrical energy by generating friction or periodically contacting and separating between the first and second triboelectric layers 541 and 542. The first and second triboelectric layers 541 and 542 may include different materials. For example, the first triboelectric layer 541 may include a material that is easily positively charged, and the second triboelectric layer 542 may include a material that is easily negatively charged. The first triboelectric layer 541 may include a first dielectric substance or a metal. The first dielectric substance may include a natural fiber material or a synthetic fiber material. In detail, the first dielectric substance may include, but is not limited to, polyformaldehyde, etylcellulose, polyamide, wool, silk, paper, cotton, wood, or PVA. The metal may include, but is not limited to, Al, Ni, Cu, or Ag. The second triboelectric layer 542 may include a second dielectric substance that is different from the first dielectric substance. The second dielectric substance may include a dielectric material having an electric charge or dipole polarization. In detail, the second dielectric substance may include, but is not limited to, fluoropolymer, silicon rubber, teflon, kapton, polypropylene, polyethylene, polyethylene terephalate, polyimide, PVDF, PDMS, PMMA, or PVC. Alternatively, the first triboelectric layer 541 may include a material that is easily negatively charged, and the second triboelectric layer 542 may include a material that is easily positively charged. The first and second triboelectric layers 541 and 542 may be charged by being forced to directly contact each other, and then may be spaced apart from each other by a desired or predetermined interval. In order to more efficiently generate electrical energy, a plurality of first protrusions and a plurality of second protrusions that are alternately arranged may be formed on surfaces of the first and second triboelectric layers 541 and 542. Alternatively, the first triboelectric layer 541 may be disposed on the second electrode 512, and the second triboelectric layer 542 may be disposed on the first electrode 522.

The second energy generation layer 550 includes a third triboelectric layer 551 that is disposed on a top surface of the third electrode 523, and a fourth triboelectric layer 552 that is disposed on a bottom surface of the fourth electrode 532. The second energy generation layer 550 may generate electrical energy by generating friction or by periodically contacting and separating the third and fourth triboelectric layers 551 and 552. The third and fourth triboelectric layers 551 and 552 may include different materials. The third triboelectric layer 551 may include a first dielectric substance or a metal, and the fourth triboelectric layer 552 may include a second dielectric substance that is different from the first dielectric substance. The first and second triboelectric layers 551 and 552 may be charged by being forced to directly contact each other, and then may be spaced apart from each other by a desired or predetermined interval. In order to more efficiently generate electrical energy, a plurality of first protrusions and a plurality of second protrusions that are alternately arranged may be formed on surfaces of the third and fourth triboelectric layers 551 and 552. Alternatively, the third triboelectric layer 551 may be disposed on the fourth electrode 532, and the fourth triboelectric layer 552 may be disposed on the third electrode 523.

When an external mechanical force is applied due to wind, vibration, sound or human motion to the textile-based energy generator 500, electrical energy may be generated from each of the first energy generation layer 540 and the second energy generation layer 550. In this case, when the first, second, and third electrode substrates 510, 520, and 530 are connected in series, more electrical energy may be obtained. Alternatively, the first, second, and third electrode substrates 510, 520, and 530 may be connected in parallel. The textile-based energy generator 500 may more efficiently generate electrical energy by inducing periodic vibrations in the flow of fluid. Also, since an amplitude of flutter that occurs at the same fluid velocity is higher in a textile-based substrate than in a film-based substrate, the textile-based energy generator 500 may more efficiently generate electrical energy than a film-based energy generator.

Each of the first, second, and third electrode substrates 510, 520, and 530 includes a textile substrate that has a flexible and stretchable 2D shape and an electrode that is coated on the textile substrate in FIG. 7. Alternatively, each of the first, second, and third electrode substrates 510, 520, and 530 may include a textile electrode that has a flexible and stretchable 2D shape as shown in FIGS. 4 and 6. Also, each of the first and second energy generation layers 540 and 550 includes two triboelectric layers that are disposed on facing electrodes and are formed of different materials in FIG. 7. Alternatively, each of the first and second energy generation layers 540 and 550 may include a triboelectric layer that is disposed on any one of facing electrodes and includes a dielectric substance as shown in FIGS. 5 and 6. In this case, the remaining one of the facing electrodes may include a metal. Although the textile-based energy generator 500 has a structure in which two energy generation layers are stacked in FIG. 7, example embodiments are not limited thereto and a textile-based energy generator having a structure in which three or more energy generation layers are stacked may be realized.

A textile-based energy generator according to the one or more example embodiments may have a flexible and stretchable textile structure, and when an external mechanical force is applied to the textile-based energy generator, electrical energy may be generated from an energy generation layer. The textile-based energy generator may more efficiently generate electrical energy by inducing periodic vibrations in the flow of fluid. Also, since an amplitude of flutter that occurs at the same fluid velocity is higher in a textile-based substrate than in a film-based substrate, the textile-based energy generator may more efficiently generate electrical energy than a film-based energy generator. Since the textile-based energy generator may have conformity to an external environment such as wind, sound, or human motion, the textile-based energy generator may more efficiently generate electrical energy in response to the external environment. The textile-based energy generator may be applied to a portable electronic device, a garment, a bag, a hat, gloves, or a flag or may be attached to a body part, to generate electrical energy. In addition, the textile-based energy generator may be attached to a transport such as an automobile, a bicycle, or a train, or may be used as a textile construction material, to generate electrical energy. While example embodiments have been particularly shown and described with reference to exemplary embodiments thereof, it will be understood by one of ordinary skill in the art that various changes in form and details may be made therein without departing from the spirit and scope of example embodiments as defined by the following claims.

What is claimed is:

1. A textile-based energy generator comprising:
   first and second electrode substrates, each of the first and second electrode substrates including a textile structure; and
   an energy generation layer between the first and second electrode substrates, the energy generation layer on at least one of the first and second electrode substrates, the energy generation layer configured to generate electrical energy by at least one of generating friction between different materials and contacting and separating the different materials, the energy generation layer including,
      a first triboelectric layer on one of the first and second textile electrodes, and the first triboelectric layer includes one of a first dielectric substance and a metal, and
      a second triboelectric layer on the remaining one of the first and second textile electrodes, and the second triboelectric layer includes a second dielectric substance that is different from the first dielectric substance, each of the first and second textile electrodes includes weaved conductive fibers having 1D shapes,
   wherein the first electrode substrate includes a first textile electrode, and the second electrode substrate comprises a second textile electrode and at least one of the first and second textile electrodes comprises graphene.

2. The textile-based energy generator of claim 1, wherein one of the first and second textile electrodes comprises graphene and the other of the first and second textile electrodes comprises one of graphene, CNTs, a metal, and a conductive polymer.

3. The textile-based energy generator of claim 1, wherein a plurality of first protrusions are on a surface of the first triboelectric layer, and a plurality of second protrusions are on a surface of the second triboelectric layer.

* * * * *